United States Patent Office 3,663,643
Patented May 16, 1972

3,663,643
RECOVERY OF BASIC ORGANIC MATERIALS
FROM THEIR HYDROLYSIS PRODUCTS
David W. Hall, Vancouver, British Columbia, Canada, assignor to Marathon Oil Company, Findlay, Ohio
No Drawing. Filed Apr. 29, 1968, Ser. No. 725,207
Int. Cl. C07c 1/20
U.S. Cl. 260—681          13 Claims

ABSTRACT OF THE DISCLOSURE

A process of recovering lactam type organic materials which have undergone hydrolysis by heating the hydrolysis products to a temperature in the range of from 50° C. to 450° C. and at a pressure of from 10 microns to 10 atmospheres while maintaining the hydrolysis products in their free base or acid addition salt form.

The present invention relates to the recovery of basic organic solvents. More particularly, the present invention relates to the recovery of basic organic solvents from their hydrolysis products. More particularly, the present invention relates to the recovery of basic organic solvents from systems wherein they have been completely or partially hydrolyzed.

BACKGROUND OF THE PRESENT INVENTION

In U.S. Pat. No. 3,360,583, issued Dec. 26, 1967, there is described a process for the preparation of polyenes by reacting alpha-halo-substituted ethers with olefins, and splitting the resulting haloether adduct to form a hydrogen halide, alcohol and the polyolefinic product. This process is particularly applicable for the preparation of isoprene. Thus, chloromethyl methyl ether may be reacted with isobutylene to form an adduct. N-methyl-2-pyrrolidone is then added to the adduct containing reaction mixture and the resulting mixture is heated to convert the adduct to isoprene. Simultaneously, the N-methyl-2-pyrrolidone forms a complex or salt with the hydrogen chloride that is formed during the adduct cleavage step.

It has been found that, during this cleavage step, part of the basic organic solvent, e.g., N-methyl-2-pyrrolidone, decomposes or hydrolyzes to form gamma-methylamino-butyric acid. Heretofore, this portion of the solvent so decomposed was lost, thereby decreasing the over-all efficiency of the process.

Moreover, the decomposition of basic organic solvents is not a problem unique to the process described above. Basic organic materials are used in many processes wherein they are subject to decomposition, e.g., reactions of organo-metallic reagents, dehydrohalogenation of alkyl halides to yield unsaturated compounds, hydrolysis of organic and inorganic halides, etc. Also, these materials often perform functions other than to provide solvent media for the reactions. Thus, they may enter into the reaction itself. Often, the partial or complete decomposition of the basic organic materials employed in these processes renders the latter commercially unattractive or impractical due to the added expense incurred by the necessity for replenishing the material.

BRIEF DESCRIPTION OF THE INVENTION

It is an object of the present invention to overcome the above described disadvantages associated with prior art chemical processes employing basic organic materials.

It is a further object of the present invention to provide a process for the recovery of basic organic materials from the products of their hydrolytic decomposition.

It is a further object of the present invention to recover the basic organic solvents employed in the process for producing polyolefinic compounds by reacting a haloether with an olefin to produce a haloether adduct and splitting said adduct in the presence of said basic organic solvent to produce the polyolefinic product.

According to the process of the invention, the hydrolysis product, either in its free base form or as an acid addition salt is heated to cause its cyclization and simultaneous loss of water.

DETAILED DESCRIPTION OF THE INVENTION

The basic organic materials which are susceptible to hydrolytic decomposition in the processes described above and which may be recovered according to the process of the present invention may be represented by the following structural formula:

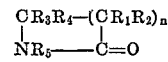

wherein $R_1$ and $R_2$ may be the same or different and are selected from the group consisting of hydrogen, aliphatic and aromatic groups, e.g., alkyl, aryl, haloalkyl, haloaryl, alkoxy, aryloxy, etc. The nature of $R_1$ and $R_2$ is not overly critical with respect to the stability of the molecule since they are located on carbon atoms alpha, beta or gamma to the carbonyl group.

Since $R_3$, $R_4$ and $R_5$ are located on carbon atoms bonded to the nitrogen and on the nitrogen atom itself it is necessary to preserve the stability of the molecule that at least one hydrocarbyl group, e.g., —$CH_2$, =CH—, etc., separate any non-hydrocarbon substituent in $R_3$ and $R_4$ from the carbon atom which is bonded to the nitrogen, and that at least two hydrocarbyl groups separate any non-hydrocarbon substituents in $R_5$ from the nitrogen atom. Subject to the above provisus, $R_3$, $R_4$ and $R_5$ may be the same or different and are selected from the group consisting of hydrogen, and substituted and unsubstituted alkyl and aryl.

$n$ may be either 2 or 3.

The preferred materials are N-methyl-2-pyrrolidone and N-methyl-valerolactams with N-methyl-2-pyrrolidone being the most preferred.

The employment of the aforementioned materials in the various processes described above results in their hydrolytic decomposition to, primarily, amino acids. According to the process of the present invention, these hydrolysis products are cyclized to their original form. It is necessary, however, that the hydrolysis products exist either in their free base form, i.e., as the free amine amino acid or as an acid addition salt. It is preferred to convert the hydrolysis products to their acid addition salts prior to effecting their conversion. Although the process of the present invention is applicable to cyclize the free base form of the hydrolysis products, the reaction proceeds at a faster rate where the hydrolysis products are first converted to their acid addition salts. Of course, where the reaction medium of the primary process wherein the basic organic material desired to be recovered is employed is acidic, the hydrolysis products will exist therein as the corresponding acid addition salt and it will be unnecessary to preliminarily form the acid addition salt. In those processes wherein the hydrolysis products are produced as the free base form, it is preferred, although not necessary, to convert the free base form to an acid addition salt. In those processes wherein a strong base is present initially or is liberated during the course of the reaction, the hydrolysis products will be produced as amino acid anions. For purposes of the present invention, it will be necessary to convert these amino acid anions either to the free base form, or more preferably, to a suitable acid addition salt.

Surprisingly, it has been further found that the present invention is applicable only to the organic materials defined by the aforementioned structural formula wherein $n$ has the stated definition. The hydrolysis products of materials other than those defined by the structural formula do not cyclize when subjected to the process of the present invention to regenerate the original material. Rather, these hydrolysis products condense in a linear fashion to form polyamides. These linear polyamides are less stable toward solvolysis, hydrolysis and the action of acids than are the cyclic compounds of the above structural formula. Thus, inasmuch as the predominant reaction in the process according to the present invention is the cyclization reaction, any linear amides formed immediately de-polymerize to form the monomeric hydrolysis product which is eventually cyclized to the desired product. Moreover, the increased stability of the cyclic basic organic solvents enables their complete recovery from their decomposition products according to the process of the present invention as opposed to the difficulty faced in attempting to recover relatively unstable linear amide materials which are converted to polyamides upon attempting their regeneration from their hydrolysis products.

Acids useful in forming the acid addition salts of the hydrolysis products of the basic organic materials include the mineral acids, such as hydrochloric acid, phosphoric acid, sulfuric acid, etc., with hydrochloric acid being preferred.

Organic acids having a $K_a$ equal to or greater than about $1 \times 10^{-5}$, such as chloroacetic, dichloroacetic acid, etc., may be utilized.

According to the process of the invention, the hydrolysis product, either in its free base form or as the acid addition salt is heated to cause its cyclization and simultaneous loss of water. The hydrolysis product starting material may be employed in its pure state, dissolved in excess basic organic material to which it is subsequently converted, dissolved in a different basic organic solvent, in admixture with other hydrolysis products or in solution or dispersion in other inert solvents, such as, toluene and other alkylaromatic solvents and high boiling alkanes and ethers.

The heating step is carried out at a temperature within the range of from about 50° C. to about 450° C., preferably from about 100° C. to about 350° C. The pressure may be varied from about 10 microns to about 10 atmospheres, with a range of from about 10 mm. Hg to about 2 atmospheres being preferred. Obviously, the optimum temperatures and pressures employed will depend in each case on the particular hydrolysis product being treated.

The water concomitantly formed as cyclization occurs must be removed as it is formed. This may conveniently be accomplished by conventional distillation at normal or reduced pressures; by azeotropic distillation with a cosolvent, such as benzene, toluene or other well known water entraining solvent, or by adsorption on a solid adsorbent such as a molecular sieve for example.

The products produced by the process of the present invention comprise the free base form of the cyclic basic organic solvent or its acid addition salt depending, of course, on the form of the hydrolysis product treated. Where the product is the acid addition salt, the acid and basic organic solvent values may be recovered therefrom according to the processes described in U.S. Pat. 3,399,119, to Hall and Hurley, filed July 8, 1966 and copending application Ser. No. 725,206 to Hall, entitled "Recovery of Acids and Organic Bases From Their Mixtures," filed Apr. 29, 1968.

The basic organic solvent, upon separation, where required, may then be recycled to the original reaction medium wherein it was initially decomposed. Obviously, the process of the present invention renders the chemical process employing these basic organic materials more commercially attractive and efficient.

Although the invention will be illustrated by reference to the process disclosed in U.S. Pat. No. 3,360,583, issued Dec. 26, 1967 to Hall and Hurley relating to the preparation of polyolefinic compounds, it will be understood that the process of the present invention is applicable for the recovery of any of the aforementioned basic organic materials which have undergone at least a partial hydrolytic decomposition by any process. Thus, the process of the invention is applicable for the recovery of basic organic solvents used in such chemical processes as reactions of organometallic reagents, dehydrohalogenation of alkyl halides to obtain unsaturated materials, hydrolysis of organic and inorganic halides, etc.

The invention will be illustrated by the following non-limiting examples.

EXAMPLE I 1.0943 g. of gamma-methylaminobutyric acid hydrochloride (MABA·HCl) was mixed with 2.6184 g. of distilled water in a small glass-stoppered flask fitted with a magnetic stirrer. The MABA·HCl had been shown by nuclear magnetic resonance spectroscopy to contain no free N-methyl-2-pyrrolidone (NMP) or NMP·HCl. The components were mixed ½ hour at room temperature. At this point, a small amount of MABA·HCl remained undissolved. A sample of this mixture was injected into a gas chromatograph set up for the specific analysis of solutions of NMP. The injection port temperature was about 350° C. Free NMP eluted at its usual retention time. Based on the water added initially (internal standard), 85% of the NMP value in the MABA·HCl charged initially eluted as free NMP.

This example shows that MABA·HCl cyclizes very rapidly at a moderately high temperature. Had the cyclization occurred slowly along the chromatographic column, a sharp chromatogram for free NMP would not have been observed. The cyclization would likely have been near-quantitative had not a small portion of the MABA·HCl remained undissolved in the original aqueous mixture.

EXAMPLE II

Pure dry MABA·HCl (20 g.) was dissolved in NMP (175 g.) and the mixture charged to a conventional distillation apparatus fitted with a gas inlet tube to permit a nitrogen purge. Potentiometric analysis showed 0.23 wt. percent HCl present as NMP·HCl and 10.4 wt. percent of MABA·HCl. About 80 g. of NMP was distilled at normal pressure and under a gentle nitrogen purge during a 3 hour period. HCl was noted to pass overhead and form NMP·HCl in the receiver. Potentiometric analysis of the distillate showed that it contained only free NMP and NMP·HCl. The distillation residue contained no HCl as NMP·HCl and only a trace of MABA·HCl.

EXAMPLE III

Chloromethyl methyl ether (analysis 95.2% chloromethyl methylether, 3.9% methylal and 0.9% bis(chloromethyl) ether) (102 g.) is mixed with 2 g. of titanium tetrachloride (0.0106 mol) in a pressure equalized dropping funnel. This mixture is added dropwise to 200 g. of isobutylene (3.5 mol) in a 500 ml. 3-neck round bottom flask fitted with a magnetic stirrer, a thermometer and Dry Ice condenser. The addition is carried out at the reflux temperature of the reaction mixture, initially about −10° C. and toward the end of addition about 0° C. over a period of 2 hours. The reaction mixture is then warmed to room temperature with the concomitant removal of part of the excess isobutylene.

N-methylpyrrolidone (253 g.) is then added to the crude reaction product (weight 172.6 g.) and the resulting mixture heated for 3 hours at a temperature of 130°

C. During this distillation, the remaining isobutylene is boiled off and the reflux ratio is adjusted such that intermediate products are continually returned to the reaction flask. In this manner, complete conversion of the 3-chloro-3-methylbutyl methyl ether to isoprene is achieved. Isoprene (74.8 g.) is obtained by distillation. The solvent containing residue is recycled for further use.

Following 3 successive isoprene producing runs, employing the same N-methylpyrrolidone medium, the latter was analyzed and found to contain 20 wt. percent

MABA·HCl

This solution was charged to a distillation apparatus equipped for the continuous addition of toluene to the distillation pot. The mixture was heated to 140–145° C. and water, together with some methanol remaining from the isoprene producing steps, was distilled overhead as an azeotrope with toluene. This procedure was carried out for seven hours; during the last four hours a large amount of anhydrous HCl was noted to pass overhead. This was collected in a Dry Ice trap and in part in an aqueous scrubber. Potentiometric analysis of the pot residue at this point showed the concentration of MABA·HCl had been reduced to 10 wt. percent. The procedure was carried out for 13 more hours. No HCl as NMP-HCl remained in the distillation pot residue. Only a trace of MABA·HCl remained in the pot residue. GLC analysis of the pot residue showed better than 95% of the NMP values charged initially (includes both MABA·HCl and free NMP) to be present and available for recovery by a simple distillation. Since a small amount of NMP co-distilled with the toluene, the conversion of MABA·HCl to free NMP may be considered to have been nearly quantitative. Moreover, not all of the toluene was recycled. Had all of the toluene been recycled, all of the NMP values would have been present in the distillation pot or the small toluene fraction allowed to collect as permanent distillate.

What is claimed is:

1. In a process for the preparation of polyenes comprising reacting a haloether with an olefin to form a haloether adduct of said olefin and splitting hydrogen halide and alcohol from said adduct to form a polyene wherein said adduct is split in the presence of a solvent having the structural formula:

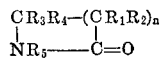

wherein $n$ is 2 or 3; $R_1$ and $R_2$ are the same or different and are selected from the group consisting of hydrogen, aliphatic and aromatic groups and $R_3$, $R_4$ and $R_5$ are the same or different and are selected from the group consisting of hydrogen and substituted and unsubstituted alkyl and aryl wherein any non-hydrocarbon substituents in $R_3$ and $R_4$ are separated from the carbon atom which is bonded to N by at least one hydrocarbyl group and wherein any non-hydrocarbon substituents in $R_5$ are separated from the nitrogen atom by at least two hydrocarbyl groups and wherein said solvent undergoes at least partial hydrolysis to provide an at least partially hydrolyzed form of said solvent, the improvement comprising:

recovering solvent in cyclized form from said at least partially hydrolyzed solvent by heating the at least partially hydrolyzed solvent while maintaining said at least partially hydrolyzed solvent in the form of the acid addition salt thereof, to a temperature in the range of from about 50° C. to about 450° C. at a pressure of from about 10 microns to about 10 atmospheres, whereby said at least partially hydrolyzed solvent is cyclized and water is split therefrom, simultaneously with said cyclization removing water split from said at least partially hydrolyzed solvent during said heating, thereby providing a cyclized solvent derived from said at least partially hydrolyzed solvent, and separating said cyclized solvent.

2. The process of claim 1 wherein said haloether is chloromethyl methyl ether, said olefin is isobutylene, said haloether adduct is 3-chloro-3-methylbutyl methyl ether and said polyolefinic compound is isoprene.

3. The process of claim 1 wherein said solvent is N-methyl-2-pyrrolidone.

4. The process of claim 1 wherein said solvent is an N-methyl-valerolactam.

5. The process of claim 1 including the step of separating said recovered solvent and recycling it to said haloether adduct splitting step.

6. The process of claim 1 wherein said water is removed by distillation.

7. The process of claim 1 wherein said water is removed by adding to said hydrolysis product a solvent which forms an azeotrope with water and azeotropically distilling said water.

8. The process of claim 1 wherein said hydrolysis product is in the form of an acid addition salt.

9. The process of claim 8 wherein said acid is a mineral acid.

10. The process of claim 9 wherein said acid is HCl.

11. The process of claim 8 wherein said acid is an organic acid having a $K_a \geq$ about $1 \times 10^{-5}$.

12. The process of claim 11 wherein said acid is trichloroacetic acid.

13. The process of claim 1 wherein said at least partially hydrolyzed solvent is in the form of an acid addition salt and said acid is selected from the group consisting of hydrochloric acid, phosphoric acid and sulfuric acid.

References Cited

UNITED STATES PATENTS

| | | | |
|---|---|---|---|
| 2,933,448 | 4/1960 | Morin et al. | 208—326 |
| 3,184,476 | 5/1965 | Wingfield et al. | 260—326.5 |
| 3,248,388 | 4/1966 | Wintersberger et al. | 260—326.5 |
| 3,470,089 | 9/1969 | Morris et al. | 208—326 |
| 3,360,583 | 12/1967 | Hall et al. | 260—681 |

OTHER REFERENCES

Degering, "An Outline of Organic Nitrogen Compounds," University Lithoprinters, Mich. (1945), pp. 648–649.

PAUL M. COUGHLAN, Jr., Primary Examiner

U.S. Cl. X.R.

208—326; 260—326.5 FN